(12) United States Patent
Babich

(10) Patent No.: US 6,924,965 B2
(45) Date of Patent: Aug. 2, 2005

(54) ELECTRO MAGNETICALLY-OPERATED DEVICE, AND A METHOD OF OPERATING THE SAME

(75) Inventor: Nikolai Babich, Kiyv (UA)

(73) Assignee: Magnasource, LLC, Haledon, NJ (US)

( * ) Notice: Subject to any disclaimer, the term of this patent is extended or adjusted under 35 U.S.C. 154(b) by 0 days.

(21) Appl. No.: 10/791,047

(22) Filed: Mar. 3, 2004

(65) Prior Publication Data

US 2004/0169989 A1 Sep. 2, 2004

Related U.S. Application Data

(63) Continuation-in-part of application No. 10/192,523, filed on Jul. 11, 2002.

(30) Foreign Application Priority Data

Dec. 29, 2001 (UA) .......................... 2001129236

(51) Int. Cl.[7] ............................... H01H 9/00
(52) U.S. Cl. ................ 361/160; 361/152; 361/156
(58) Field of Search ................ 361/152, 153, 361/154, 155–156, 160

(56) References Cited

U.S. PATENT DOCUMENTS 4,243,964 A * 1/1981 Bogner et al. .............. 335/156
4,683,452 A * 7/1987 Henley ....................... 335/234
4,826,082 A * 5/1989 Greiner et al. .............. 239/113
5,820,032 A * 10/1998 Reiter ....................... 239/585.1

* cited by examiner

Primary Examiner—Anthony Dinkins
(74) Attorney, Agent, or Firm—J. Zborovsky

(57) ABSTRACT

An electromagnetically operated device has an electromagnet including a magnetic guide having a movable armature and at least one air gap, a magnetizing coil provided on the magnetic guide, the magnetic guide having at least a part formed as an insert of a magnetically hard material, the magnetic guide having an immovable part formed as a cylinder, the movable armature being provided with a cover of the cylinder, the magnetizing coil being located inside the cylinder coaxially to the latter, a rod extending along an axis of the cylinder, located in an inner hollow of the cylinder, and having a part of composed of a electromagnetically soft material, the armature being formed so as to close the magnetic guide with formation of a three dimensional closed structure including the cylinder, the cover, the rod with a possibility of providing a holding force which is equal to a pulling force formed by a winding of the magnetizing coil during a supply of a short-term current pulse to the winding of the magnetizing coil and demagnetization of a material of the rod.

15 Claims, 12 Drawing Sheets

ELECTRO MAGNETICALLY-OPERATED DEVICE, AND A METHOD OF OPERATING THE SAME

CROSS-REFERENCE TO A RELATED APPLICATION

This application is a continuation-in-part of patent application Ser. No. 10/192,523 filed on Jul. 11, 2002.

BACKGROUND OF THE INVENTION

The present invention relates to a electromagnetically-operated device, and a method of operating the same.

Devices of the above-mentioned type are known in the art. They include in particular magnetic triggers, locking devices for blocking locks of safe boxes, automobiles, doors, etc. for preventing unauthorized penetration. In such constructions an electromagnet which performs the function of an electromechanical drive includes a magnetizing coil with a magnetic guide of a ferromagnetic material with at least one air gap. When a pulse of electric current is supplied to a winding of the magnetizing coil of ferromagnetic material of the magnetic guide, a magnetic flux which is generated in the magnetic guide attracts a movable armature. When the pulse signal of electric current is removed from the winding of the coil, the magnetic flux disappears, and as a result a holding force of the armature disappears as well, and then the armature is returned to an initial position under the action of a return spring.

It is also known to control a magnetic flux of an electromagnet with a relay characteristic with the use of at least two stable levels of values of the magnetic flux in the magnetic guide, by supplying control pulses of electric current into the winding of a magnetizing coil with the possibility of obtaining an attracting force of the movable part of the magnetic guide (its armature), which is realized in an electromagnet with at least one air gap as disclosed for example in the German patent document DE 19639548 A1. The known method is not sufficiently effective due to a high energy consumption, since the winding of the coil is always under current during its excitation and remains in this condition until the controlling pulse signal is removed. Moreover, the known method is relatively insufficiently effective due to a high number of emergency failures during the use, that are connected with failures of windings of the magnetizing coil which is always under current in an excited condition.

In another known method of operating of the electromagnetically-operated device with controlling a magnetic flux of an electromagnet with a relay at least two stabile levels of values of the magnetic flux in the magnetic guide are achieved, by supplying controlling pulses of electric current into the winding of the magnetizing coil with the possibility of obtaining an attracting force of a movable part of the magnetic guide (its armature) and which is realized in an electromagnet with at least one air gap is disclosed for example in the European patent document EP 0779454. In the known method of controlling a magnetic flux of an electromagnet, the above mentioned disadvantages are partially eliminated. However, the efficiency of the known method is still low for the same reasons.

The construction of the known electromagnet does not have a closed metal structure. As a result of this, its efficiency is reduced due to high magnetic flux of dissipation. Moreover, the construction of the known electromagnet does not have the property of a magnetic memory, since it does not provide the possibility of remagnetization of electromagnetically hard and electromagnetically soft materials of the magnetic guide. Therefore the known electromagnet does not provide a possibility of realizing the method of efficient control of the magnetic flux with two short-term pulses of different polarities in accordance with the principle "turned on-turned off".

Another electromagnet of an electromagnetic drive of an executing device, preferably a magnetic trigger (contactor) realizes the method of controlling a magnetic flux in a magnetic guide, in which a winding of the magnetizing coil is arranged with a movable armature and which has at least one air gap, wherein at least a part of the magnetic guide is formed as an insert of a electromagnetically hard material disclosed for example in the European patent document EP 07794540. In the construction of the known electromagnet, a part of the armature is composed of a electromagnetically hard material, and the magnetic guide during the operation of the electromagnet forms a three dimensional closed metallic structure, so that losses of a magnetic flux due to dissipation are reduced. However, the efficiency of the known electromagnet is insufficient because the permanent magnet which is used in its magnetic guide is arranged with a rigid marking of the magnetic poles, and during the operation of the electromagnet the part of its magnetic guide which is composed of a electromagnetically hard material does not remagnetize. As a result, the magnet guide of this known electromagnet does not have the property to obtain a magnetic memory. In other words when there is no current pulse in the winding of the magnetizing coil, the magnetic flux in the magnetic guide of the known electromagnet practically is absent. In any event, it is insufficient for providing a required force of attraction and holding the armature. Therefore, the known electromagnet has the above mentioned disadvantages and in particular a high energy consumption, insufficient reliability during use, insufficient functionality.

SUMMARY OF THE INVENTION

Accordingly, it is an object of the present invention to provide an electro electromagnetically-operated device, and a method of operating the same, which avoids the disadvantages of the prior art.

In keeping with these objects, one feature of the present invention resides, in an electromagnetically operated device comprising an electromagnet with a magnetic guide having a movable armature and at least one air gap; a magnetizing coil provided in said magnetic guide, said magnetic guide having at least a part formed as an insert of a magnetically hard material, said magnetic guide having an immovable part formed as a cylinder, said movable armature including a cover for said cylinder, said magnetizing coil is located inside said cylinder, a rod extending along an axis of said cylinder, located in an inner hollow of said cylinder, and having parts composed of a magnetically soft material, said armature being formed so as to close said magnetic guide with formation of a three dimensional closed structure including said cylinder, said cover, said rod with a possibility of providing a holding force which is equal to a pulling force formed by a winding of said magnetizing coil during a supply of a short-term current pulse to the winding of said magnetizing coil and demagnetization of a material of said rod.

In accordance with another inventive feature of the present invention, the electromagnetically operated device is proposed which is formed as a valve operated by the electromagnet of the present invention.

In accordance with still another feature of the present invention, the electromagnetically operated device is a compressor which is operated by the electromagnet formed in accordance with the present invention.

In accordance with still a further feature of the present invention, the electromagnetically operated device is a starter relay for an automobile, which is actuated by an electromagnet of the present invention.

In accordance with still a further feature of the present invention, the electromagnetically operated device is an electromagnetic coupling which is actuated by an electromagnet in accordance with the present invention.

In accordance with still a further feature of the present invention, the electromagnetically operated device is an electromagnetic lock actuated by the electromagnet in accordance with the present invention.

In accordance with still another feature of the present invention, the electromagnetically operated device is a load lifting device, actuated by the electromagnet in accordance with the present invention.

In accordance with a further feature of the present invention, a method of operating an electromagnetically-operated device is proposed including the steps of providing an electromagnet including a magnetic guide having a movable armature and at least one air gap, a magnetizing coil provided in said magnetic guide, said magnetic guide having at least a part formed as an insert of a magnetically hard material, said magnetic guide having an immovable part formed as a cylinder, said movable armature being formed as a cover of said cylinder, said magnetizing coil being located inside said cylinder coaxially to the latter, a rod extending along an axis of said cylinder and being located in an inner hollow of said cylinder, and having at least a part composed of a magnetically soft material, and forming said armature so as to close said magnetic guide with formation of a three dimensional closed structure including said cylinder, said cover, said rod with a possibility of providing a holding force which is equal to a pulling force formed by a winding of said magnetizing coil during a supply of a short-term current pulse to the winding of said magnetizing coil and demagnetization of a material of said rod.

It is another feature of the invention to provide a electromagnetically-operated device, comprising an electromagnet; means for controlling a magnetic flux of the electromagnet with a relay pulling characteristics characterized by at least two stabile levels of values of a magnetic flux in a magnetic guide, with a supply of controlling pulses of electric current into a winding of a magnetizing coil with obtaining a pulling force of a moving part of a magnetic guide of the electromagnet at least with one air gap, the magnetic guide being formed at least partially of a electromagnetically soft material which a property to maintain at least two stabile conditions of magnetization; means for supplying the controlling pulses as two short-term pulses having an opposite polarity and supplied into the magnetizing coil on the magnetic guide of the electromagnet, with a supply of a first pulse providing a closing of a magnetic circuit and minimization of magnetic resistance of the magnetic guide due to minimization of the air gap of the magnetic guide with subsequent maximization of the magnetic flux and the magnetic guide with its transfer to one of the stabile conditions characterized by a maximum value of an magnetic flux in the magnetic guide which corresponds to an energy of the controlling pulse action, with a possibility of maintaining the magnetic guide of the electromagnet in this stabile condition, and providing its holding or attracting force until a supply of a second controlling pulse of electric current of the opposite polarity whose energy characteristic has a value sufficient for transferring the magnetic guide into a second stabile condition which is characterized by a different value of the magnetic flux and a different value of the holding or attracting force.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
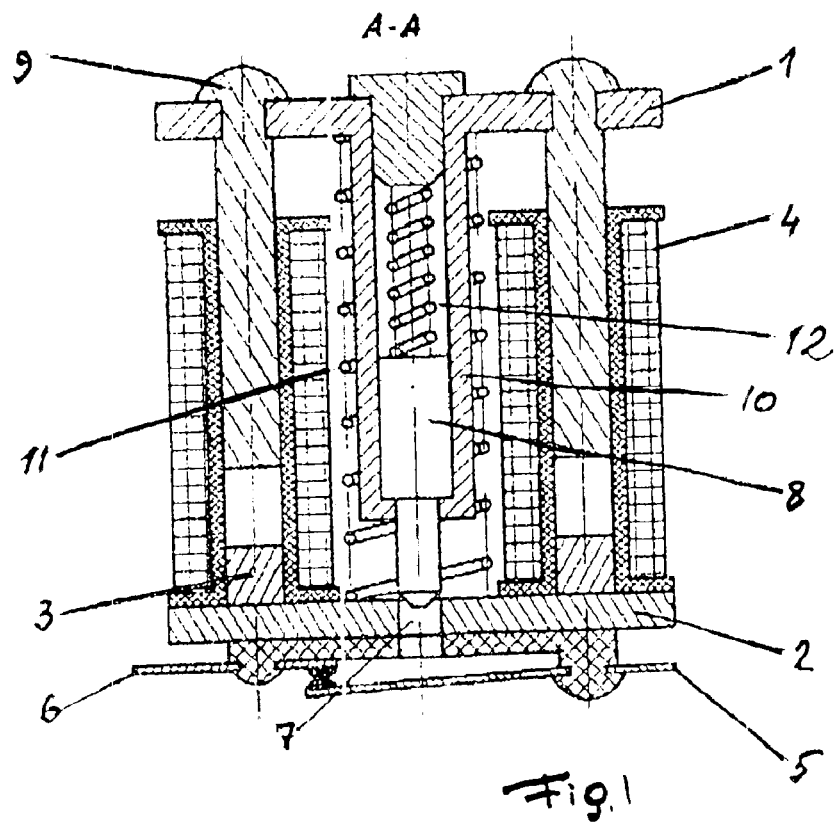
FIG. 1 is a view showing an electromagnet with a linear movement of an armature, in a longitudinal cross-section from a front side, for magnetically operated device of the present invention.
Figure 2:
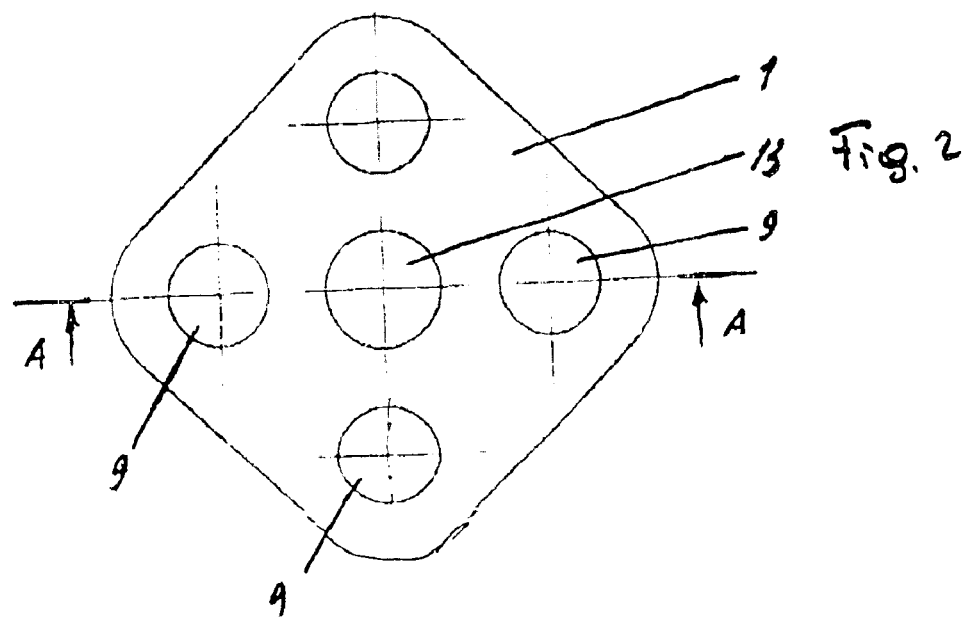
FIG. 2 is a view showing an electromagnet with a linear movement of an armature, as viewed from above, for magnetically operated device of the present invention.

An electromagnetically operated device in accordance with the present invention has an electromagnet with a magnetic guide shown in FIGS. 1 and 2 and including a movable part 1 and an immovable part 2. The immovable part 2 which forms a stator of the magnetic guide includes a base formed as a steel plate with at least two inserts 3 composed of a electromagnetically hard material and magnetizing coils 4 arranged on it. It further has normally closed contacts 5 and 6 for turning a winding the magnetizing coil 4. An opening 7 is formed in the center of the base for passage of a pusher 8 for turning off the contacts. The movable part 1 which forms an armature of the magnetic guide is formed as a steel plate with at least two rods 9 attached to it. A cylindrical cup 10 is arranged in the center of the movable plate and surrounds the pusher 8 for turning off the contacts 5 and 6. It is provided with at least one return spring 11 and 12. The cup is closed by a cover 13 from above.

Figure 3:
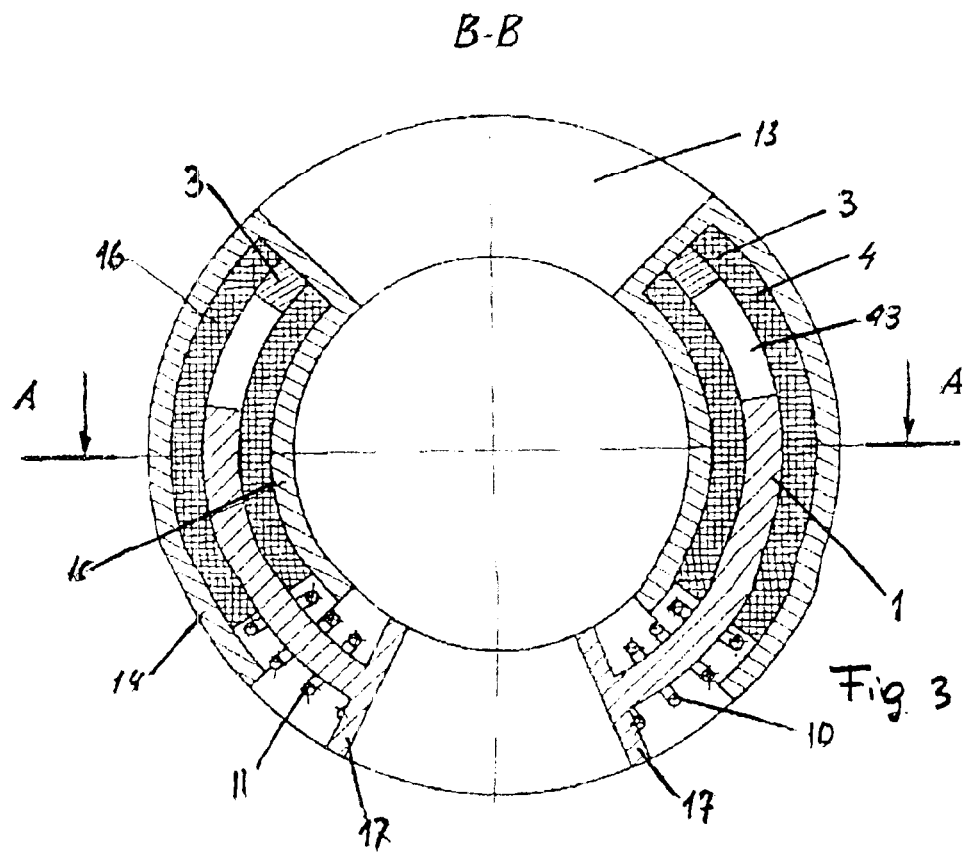
FIG. 3 is a view showing an electromagnet with a turnable displacement of an armature, in a transverse cross-section as seen from above, for magnetically operated device of the present invention.
Figure 4:
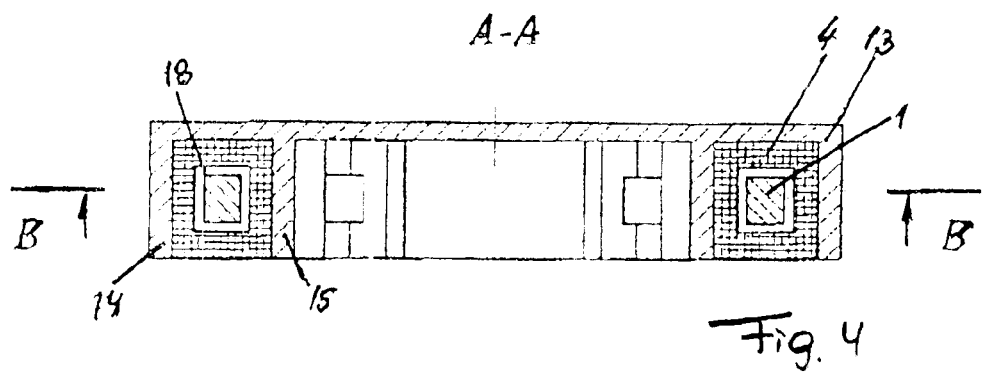
FIG. 4 is a view showing an electromagnet with a turnable displacement of an armature, in a longitudinal cross-section as seen from the front, for magnetically operated device of the present invention.

In the electromagnet of an electromagnetic drive shown in FIGS. 3 and 4, the magnetic guide includes a housing 13 formed as a disc. At least one magnetic system having a horse-shoe (segment) shape with a coaxially arranged side walls 14 and 15 is located on the housing. The housing accommodates at least one magnetizing coil 4 and at least one demagnetizing coil 16. The armature 1 of the magnetic guide is provided with a head 17 having a rectangular shape, return springs 10 and 11, and can move along a shaped passage 18 extending along a circular arc. An insert of a electromagnetically hard material is arranged on the bottom of the passage and fixed to the wall of the housing.

Figure 5:
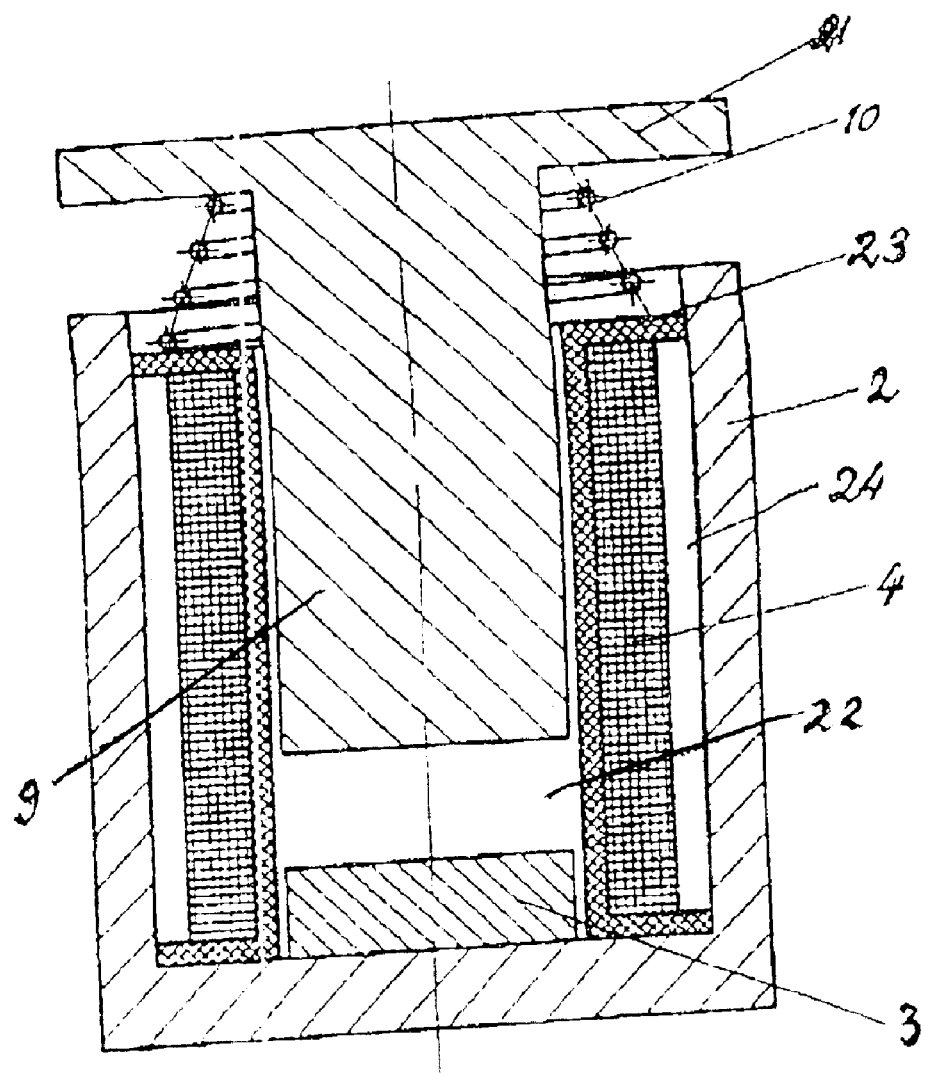
FIG. 5 is a view showing an electromagnet, in a longitudinal cross-section as seen from the front, for magnetically operated device of the present invention, with one rod.

In the electromagnet of the electromagnetic drive shown in FIG. 5, a magnetic guide is formed as a hollow steel cylinder (St3). Its part formed as an insert 3 is composed of a electromagnetically hard material, in particular of a samarium-cobalt alloy KSP37A (SmCo) while a movable armature 1 is formed as a cover 21 with the steel rod 9 (St3) which is located coaxially in an inner cavity 22 of a casing 23 of the magnetizing coil 4. In turn, the casing 23 is also located coaxially in an inner hollow 24 of the cylinder 2 and embraces the rod 9. The magnetic guide is formed with a possibility of a reciprocating linear movement of the rod 9 in the hollow 22 of the casing 23 and with the possibility of closing it with the cover 21 of the cylinder 2, and also with the possibility of touching by the rod 9 the insert 3 at the bottom of the cylinder 2 with a minimization of an air gap of the magnetic guide and the possibility of forming a three dimensionally closed structure (cylinder 2, cover 21, rod 9) and magnetizing of the insert 3 of the electromagnetically hard material, with providing a retaining force of the electromagnet, which mainly is equal to the pulling force generated by the magnetizing coil 4.

The additional technical result which is obtained with the use of the inventive device shown in FIG. 5 resides in an increase of noise protection of the magnetic system from outer influences.

For analysis of a magnetic circuit it is convenient and accepted to use an analogy between magnetic and electrical circuits. In this case the magnetic circuits are represented as electrical diagrams which illustrate an electrical circuit analogous to a magnetic circuit, and an analysis of the analogous electrical circuits is performed.

Figure 6:
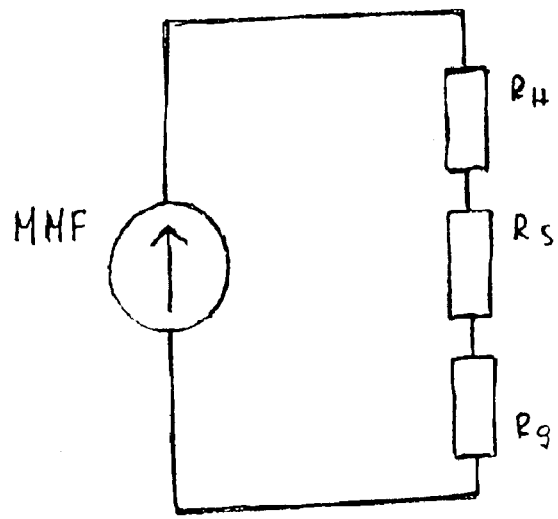
FIG. 6 is an electrical diagram of a magnetic circuit of a magnetic guide of the electromagnet for magnetically operated device of the present invention.

FIG. 6 shows an electrical diagram which represents an electrical equivalent of a magnetic circuit of the magnetic guide of the inventive electromagnet. The electromagnet, at least partially, is composed of a electromagnetically hard material. The analysis of the circuit is presented herein below.

In FIG. 6 a part of the magnetic guide which is formed of a electromagnetically hard material is illustrated as a source of the magnetic moving force MMF and the magnetic resistance $R_H$ of a electromagnetically hard material, while another part of the magnetic guide which is formed of a electromagnetically soft material is illustrated as a magnetic resistance $R_s$ of the magneto electromagnetically soft material. The air gap of the composite magnetic guide is represented in FIG. 6 as a magnetic resistance $R_G$ of the air gap. Then the value of the magnetic moving force is proportional to the residual of magnetization of the electromagnetically hard material, while the values of magnetic resistance $R_H$, $R_S$ and $R_G$ are proportional correspondingly to a magnetic permeabilities $M_H$, $M_S$, $M_G$ of the electromagnetically hard material, electromagnetically soft material and air gap. In addition, they are correspondingly proportional to the length (length of flux lines) of the electromagnetically hard material, electromagnetically soft material and the value of the air gap. It is to be understood when the lengths (lengths of power lines) of the electromagnetically hard and electromagnetically soft materials and the value of the air gap increase, their magnetic resistance increase, and when the lengths decrease, their magnetic resistances decrease correspondingly.

Figure 7:
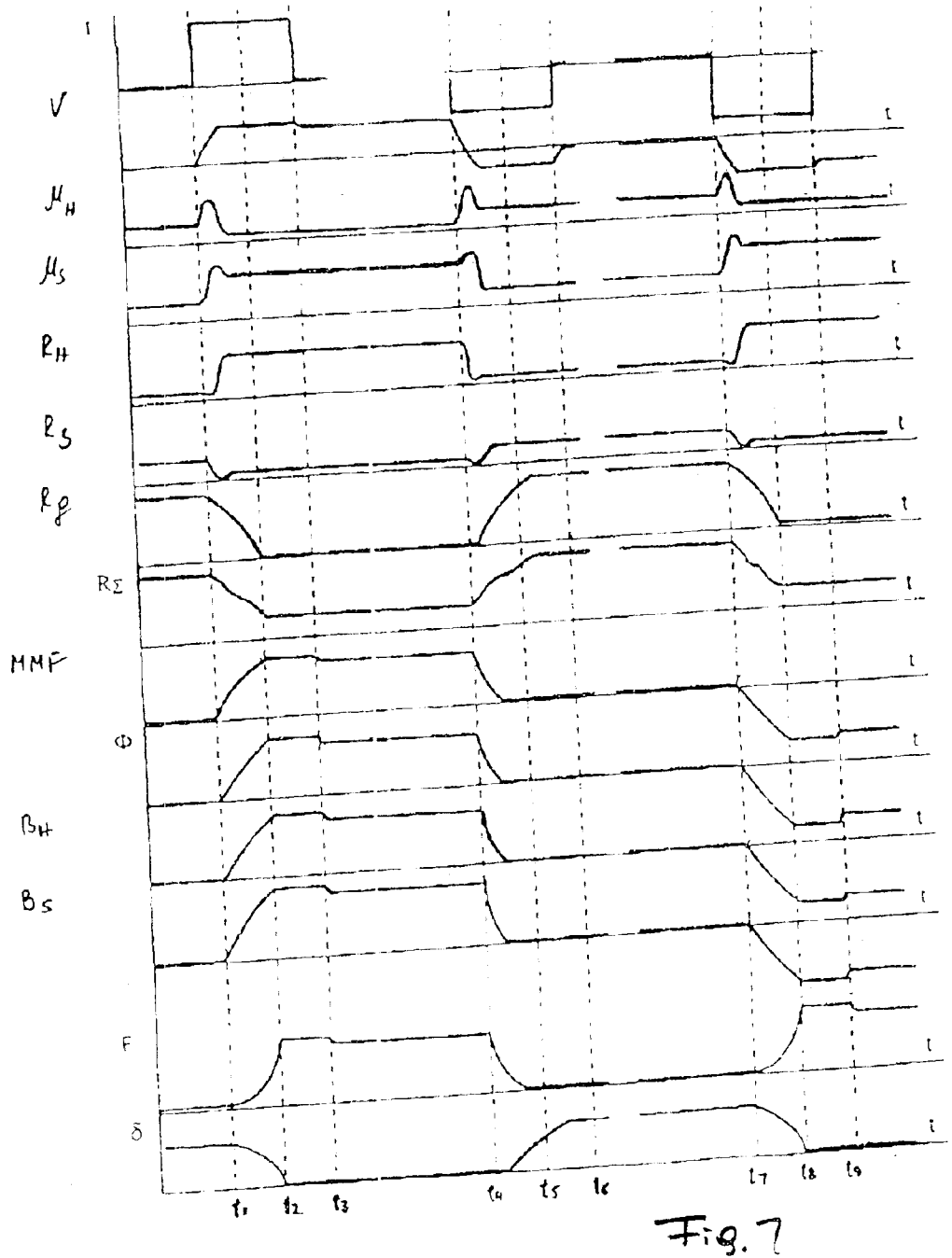
FIG. 7 is a view showing time diagrams of parameters which characterize the processes in the electromagnet in accordance with the present invention.

FIG. 7 shows a time diagrams of parameters which characterize the physical processes in the composite magnetic guide of the device shown in FIGS. 1–5, composed at least partially of a electromagnetically hard material when the inventive method of controlling of the magnetic flux of the electromagnet is performed.

On the diagrams the values I(t) H(t), $\mu_H(t)$, $\mu_S(t)$, $R_H(t)$, $R_S(t)$, $R_G(t)$, MMF(t), $\phi(t)$, $B_H(t)$, $B_S(t)$, F(t), $\delta(t)$, correspond to the following characteristic in dependence on time.

controlling pulses of electric current in a winding (4) of the magnetizing coil;

intensity of a magnetic field;

magnetic permeability in electromagnetically hard material of the magnetic guide;

magnetic permeability in electromagnetically soft material of the magnetic guide;

magnetic resistance of the electromagnetically hard material of the magnetic guide;

magnetic resistance of the electromagnetically soft material of the magnetic guide;

magnetic resistance of an air gap;

sum magnetic resistance of the magnetic guide;

magnetic moving force which acts in the magnetic guide;

magnetic flux in the magnetic guide;

magnetic induction in electromagnetically hard material of the magnetic guide;

magnetic induction in electromagnetically soft material of the magnetic guide;

attracting force of the electromagnet;

value of air gap in the magnetic guide.

On the time diagram I(t) a beginning of the action of the controlling pulse of the electric current in the winding of the magnetizing coil 4 is shown which starting from the time moment $t_1$ increases to its amplitude value.

The same time moment $T_1$, an increase of voltage V of the magnetic field starts to the value which is determined by the amplitude of the controlling pulse of electric current I in the winding of the magnetizing coil.

In accordance with the increase of voltage W of the magnetic field from the moment of time $T_1$, an increase of a magnetic permeability h of the electromagnetically hard material starts from the value $\mu 0$ to the value $\mu$max and a subsequent increase to a minimal value caused by saturation of the electromagnetically hard material. Analogous changes occur in the magnetic permeability $\mu S$ in the electromagnetically soft material. During this process, the magnetic permeability $\mu_S$ of the electromagnetically soft material which does not have a pronounced saturation, increases to the value which is by 1–2 orders greater than a magnetic permeability of the electromagnetically hard material reaching a pronounced saturation.

The changes of the magnetic resistance $R_H$ of the electromagnetically hard material and the magnetic resistance $R_S$ of the electromagnetically soft material in time which represent the values inversely proportional to the corresponding magnetic permeabilities are shown on the time diagrams $R_H(t)$ $R_S(t)$, correspondingly.

As can be seen from the time diagrams $R_H(t)R_S(t)$ the above mentioned magnetic resistance in a time moment $t_1$ start lowering, and this lowering continues until $R_H$ and $R_S$ reach values determined by a value of maximum magnetic permeability $\mu$max. The magnetic resistance of the electromagnetically soft material obtains its final value which is 1–2 orders less than the magnetic resistance of the electromagnetically hard material.

A total magnetic resistance $R_\Sigma$ of the composite magnetic guide which is composed at least partially of a electromagnetically hard material can be represented as a sum of the magnetic resistances of the electromagnetically hard material $R_H$, electromagnetically soft material $R_S$ and air gap $R_G$ as shown in FIG. 6. The value of the magnetic resistance $R_G$ of the air gap is a function which is proportional to the value of the air gap $\delta$ and it starts reducing in a time moment $t_1$, while in the time moment $t_2$ it reaches its minimum value. In the same time moment $t_2$ the value of the magnetic resistance of the air gap $R_G$ reaches its minimal value.

The value of magnetic inductions $B_H$ in the electromagnetically hard material and $B_S$ in the electromagnetically soft material and the value of the magnetic flux $\phi$ in the magnetic guide, results in the value of the magnetic moving force MMF increasing from the time moment $t_1$ due to the increase of the intensity of the magnetic field V and reduction of the total magnetic resistance of the magnetic guide $R_\Sigma$. They finish their increase after finishing of the increase of intensity V of the magnetic field, after finishing of the process of magnetization of the electromagnetically hard and electromagnetically soft material, after finishing of the process of minimization of the air gap.

The attraction force F which is a function of the magnetic flux and the value of the air gap also starts increasing at the time moment $t_1$ and reaches its maximum value when the value of the air gap $\delta$ reaches its minimal value.

The above described physical variables maintain their values to the time moment $t_3$, or in other words to the moment of finishing of the action of the controlling electric current pulse in the winding of the magnetizing coil. In this time moment $t_3$ the intensity of the magnetic field V and the magnetic moving force MMF start reducing. However, this reduction is limited by the retained magnetization of the electromagnetically hard material, while the value of magnetization of the electromagnetically hard material in turn is limited by a low total magnetic resistance $R_\Sigma$ of the magnetic guide which is retained due to the high intensity due to the magnetic field. Therefore, practically a known fact is maintained, or in other word the presence of a positive feedback between the above mentioned variables, while the above mentioned variables counteract their mutual decrease. This new property of the magnetic circuits which is determined by the inventor has a significant importance for the present invention, both for the method and the device in which method is supplemented.

A "catching effect" or an effect which is analogous to a "trigger effect" takes place here. As a result of the above described processes, the intensity of the magnetic field V, the value of the magnetic induction in the electromagnetically hard material $B_H$ and in the electromagnetically soft material $B_S$, the magnetic moving force MMF, the magnetic flux $\phi$), and the attraction force F retain their values at the level of 80–95% of the values which these variables had in the time moment $t_3$. The above described condition is one of stabile conditions of the magnetic guide.

This stabile condition is retained until the supply of a second controlling pulse into the winding of the magnetizing coil at the time moment $t_4$.

In this case the second controlling pulse must have an opposite, (when compared with the first controlling pulse) polarity and its value I must provide the intensity V of the magnetic field equal to a coercive force Vc of the electromagnetically hard material, as can be seen on the diagram V(t). On the time diagram such condition corresponds to the time moment $t_5$. Here a full demagnitization of the electromagnetically hard material takes place, or in other words $B_H=0$, while the magnetic permeabilities $M_H$ of the electromagnetically hard material and of the electromagnetically soft material, the magnetic resistance $R_H$ of the electromagnetically hard material and $R_S$ of the electromagnetically soft material, $R_G$ of the air gap and the total magnetic resistance $R_\Sigma$ of the magnetic guide, magnetic inductions $B_H$ of the electromagnetically hard material and $B_S$ of the electromagnetically soft material, the magnetic flux $\phi$, the attraction force F and the value of the air gap $\delta$ are subjected to changes which in accordance with their character are opposite to the changes described in the time interval from $t_1$ to $t_2$, without consideration of the remagnetization of the ferromagnetic materials of the magnetic guides, or in other words electromagnetically soft material of the core and electromagnetically hard material of the insert.

The value of the magnetic flux $\phi=0$ and the above described values of the other parameters characterize the second stabile condition of the magnetic guide.

The time diagram I(t) shows the beginning of action at the time moment $t_7$ of the second controlling current pulse in the winding of the magnetizing coil which provides one more stabile condition of the magnetic guide analogous to the stabile condition described in the time interval from $t_3$ to $t_4$, which however has the difference in that the vector of the magnetic flux $\phi$ has a direction which is opposite to the direction in the time interval from $t_3$ to $t_4$. For obtaining this stabile condition, it is necessary to supply in the winding of the magnetizing coil a controlling pulse with a polarity opposite to the polarity in the time interval from $t_1$ to $t_2$, with an amplitude sufficient for remagnetization of the electromagnetically hard material. Time dependencies of the parameters shown in FIG. 7 in the time interval from $t_3$ to $t_2$ are the same as in the time interval from $t_1$ to $t_2$ with a difference that the intensity of the magnetic field, the magnetic flux $\phi$), the magnetic inductions $B_H$ of the electromagnetically hard material and $B_S$ of the electromagnetically soft material have here the opposite polarity.

The electromagnet shown in FIGS. 1–8 in accordance with the present invention operates in the following manner:

When a pulse voltage is supplied to the winding of the magnetizing coil and a pulse current is excited in it, a magnetic flux is formed in the magnetic guide, which provides an attraction of the armature of the magnetic system to the stator, regardless of the polarity of the supplied first controlling signal. This magnetic flux provides the attraction of the armature of the magnetic system to the stator with overcoming of a force created by the return spring.

The mass of the pusher 8 for turning off the contacts 5, 6 in FIG. 1 and the force of the return spring 10 are selected so that the pusher 8, due to its inertia, in the beginning of the stroke of the armature 1 compresses the spring 10 and returns to an initial position only after closing of the circuit of the magnetic guide including "armature 1-insert 3-stator 2", with provision of turning off of the winding 4 of the magnetizing coil by the normally closed contact 5, 6 only after elimination of the air gap between the electromagnetically hard inserts 3 and the rods of the armature 2.

The magnetic guide provides remagnetization of the composite magnetic guide and "memorization" of the magnetic flux in a currentless condition of the winding 4 of the magnetizing coil. In particular, when there is no current in the coil the magnetic guide provides a flow of such magnetic flux which is sufficient for forming a force necessary for holding the armature in the attracted condition.

A return of the armature 1 to its initial is provided by a short-term current pulse into an oppositely wound winding, or by pulse voltage of a different polarity with a calculated amplitude, or a calculated time length in accordance with current, or by a series of reducing pulse oscillations.

The inventor confirmed by calculations and experiments that a significantly increased efficiency is provided, which includes an energy economy, a significant reduction of failures, and an increase of time of a failure free operation of commutating devices, and also in a significant expansion of functional use of the new devices.

Figure 8:
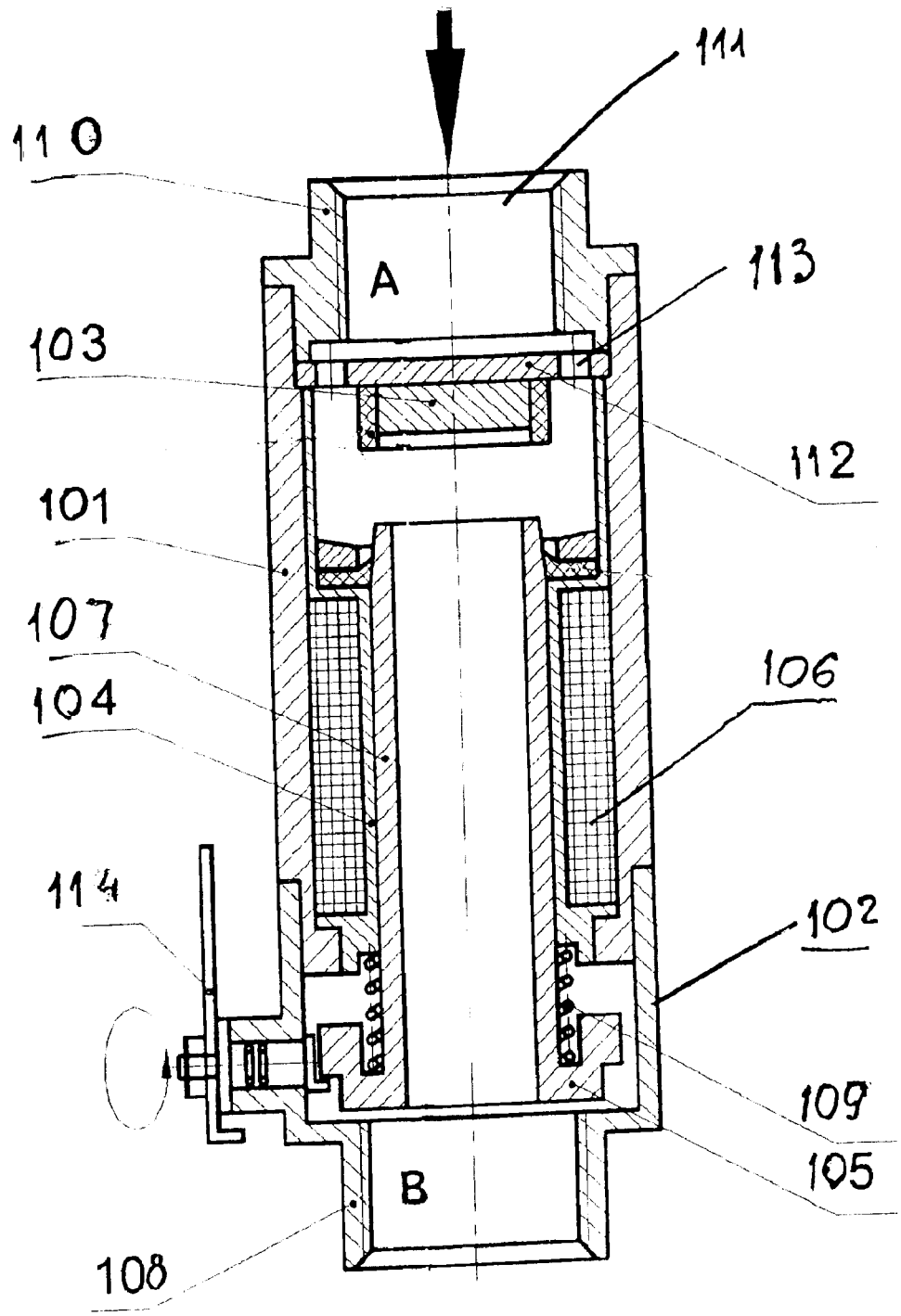
FIGS. 8 and 9 are views showing an electromagnetically operated device in accordance with the present invention which is formed as a valve.
Figure 9:
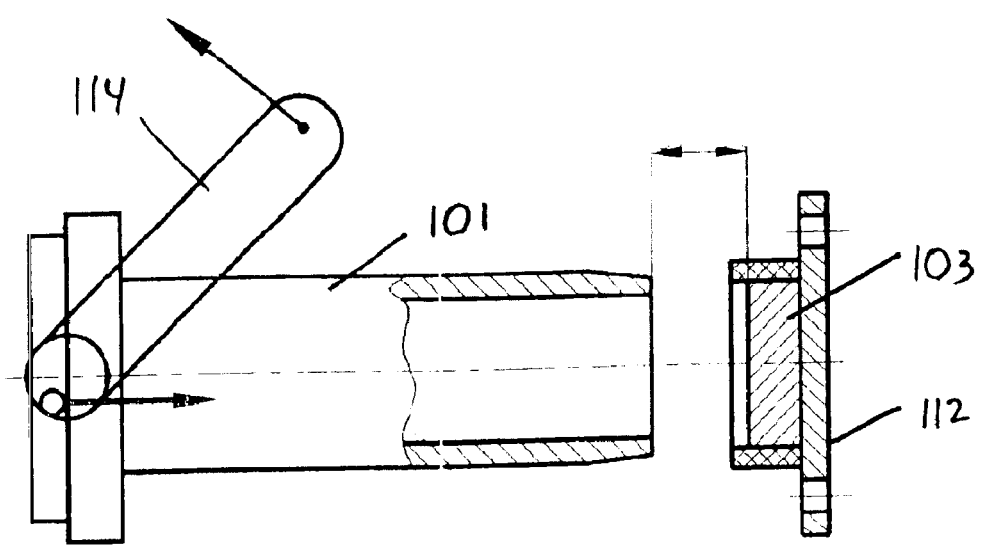

FIGS. 8 and 9 shows an electromagnetically operated device which is formed as a valve. The valve includes a housing 101, a nut 102 with an outlet 108, a magnetizing coil 106 which is coaxially arranged in the housing. A movable armature 104 is located in an axial passage of the magnetizing coil 106 and provided with a cover 105 and a rod 107 of magnetically soft material. A return spring 109 is further provided. An insert 103 is formed of a magnetically hard material. A nut 110 forms an inlet 111. A plate 112 is further provided throughgoing openings 113.

The above operates in the following manner: When a short time pulse is supplied from a control circuit into the magnetizing coil 106, a magnetic flux is generated which moves the armature 104 and compresses the return spring 109, and also magnetizes the magnetically hard insert 103. The magnetic flux which is accumulated in the magnetically hard insert 103 is closed through the plate 112, the wall of the housing 101, the cover 105 and the armature 104 which provides the clearance between the cover 105 and a seat of the valve, so that the fluid passes from the cavity A into the cavity B.

The valve is closed after the supply of a short-term pulse into the magnetizing coil 106, so that the magnetic circuit is demagnetized and the armature 104 is moved to its initial position by the return spring 109, and the communication between the cavity A and the cavity B is interrupted. The valve has significant advantages in that, with the pulse control the pulling force of the electromagnet is increased many times which in turn expands a range of applications of the valves, of the valves which direct action, the valves of the direct action with a coaxial carrier do not need a significant housing which conventionally is made by casting and/or stamping composed of non-ferrous materials and is very expensive to produce, and finally it operates without consumption of energy so as to reduce expenses and increase reliability.

In the position in which the handle 114 is located along the axis of the valve, under the action of the return spring 109 between an end surface of the rod 107 and the magnetically hard insert 103 there is a maximum gap. By turning of the handle 114, a cam limits the stroke of the rod 107 so as to reduce a cross-section between the end surfaces. In this condition, the magnetic system is not magnetized, and the valve operates as a simple mechanical valve.

Figure 10:
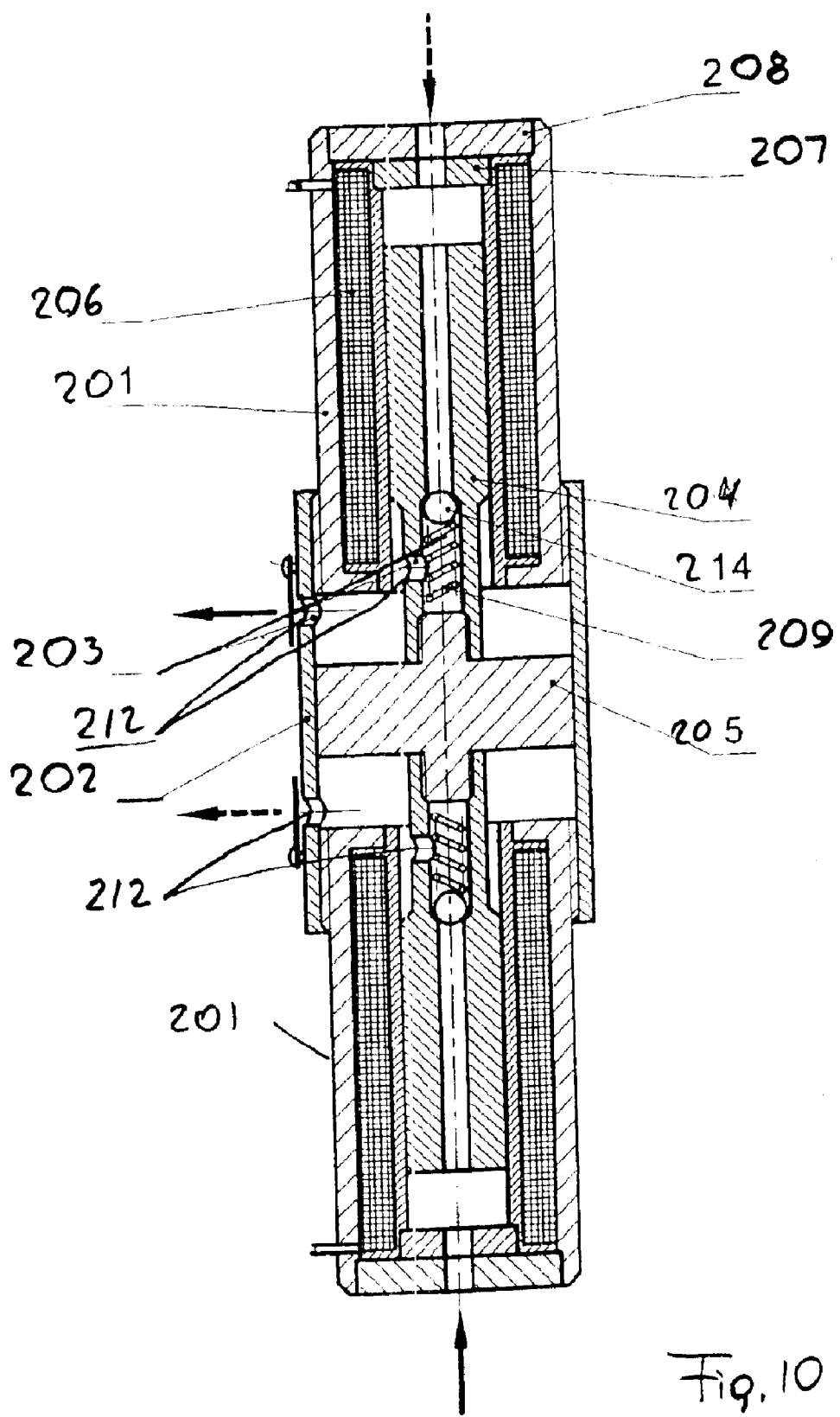
FIG. 10 is a view showing an electromagnetically operated device in accordance with the present invention which is formed as a compressor.

FIG. 10 shows the electromagnetically operated device of the present invention formed as a compressor. It has a housing 201 composed of two parts which are mirror symmetrical relative to one another and fixed in a casing 202. Each part of the housing 201 includes an armature 204 with an inlet valve 203 and a spring 209 located in an axial passage of a magnetizing coil 206. The housing 201 is closed by a bottom 208 having an inner side with a magnetically hard insert 207. Both armatures are connected by a piston 205.

The device separates in the following manner: Control pulses are supplied to the magnetizing coils 206 alternatingly, so that a magnetizing pulse is supplied to one coil while a demagnetizing pulse is supplied to the outer coil and vice versa. This provides a displacement of the armatures by the magnetic force in one direction or in the other direction, together with the piston 204, 205. This causes on the one hand a suction through the channels 212 through the inlet, and compression at the other side of the piston 205 as well as expelling of the fluid through the outlet valve 214. The magnetically hard insert 207 provides a reduction of supply of pulse energy into the magnetizing coil 206 approximately by 20% when compared with the conventional solenoid. It is a more efficient source of magnetic energy than the material of a magnetic guide and therefore it demagnetizes itself and provides the magnetization of the whole magnetic circuit and therefore energy for magnetization in an opposite part of the compressor is a reducant.

Figure 11:
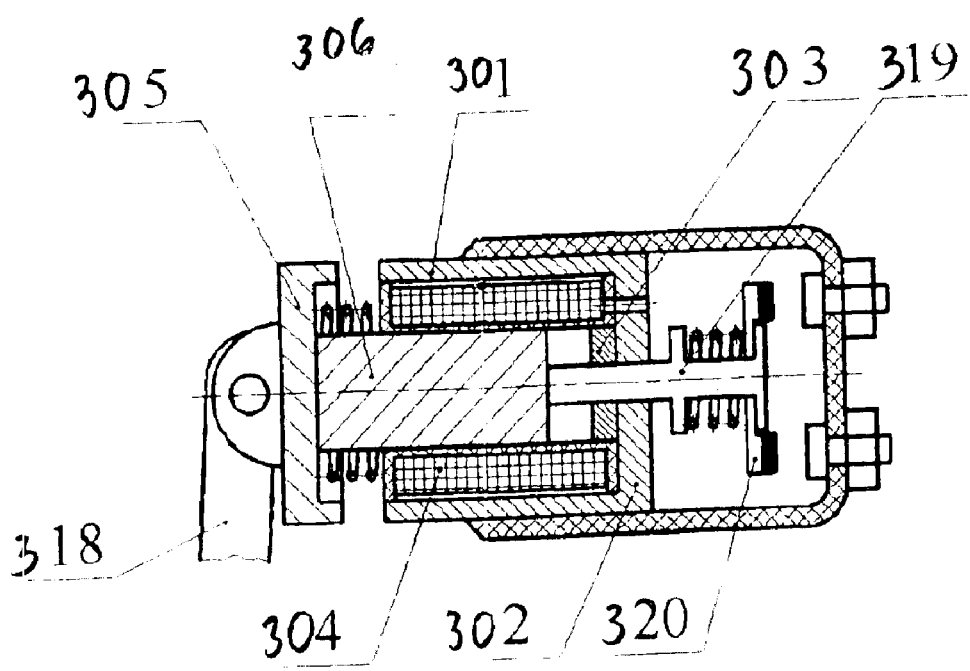
FIG. 11 is a view showing an electromagnetically operated device in accordance with the present invention which is formed as a starter relay for automobile.

FIG. 11 shows a magnetically operated device which is formed as a pulling relay of a starter for automobile. When a short-term power is supplied into a magnetizing coil 304, an armature 306 moves until it touches an end surface of a magnetically hard insert 303, and simultaneously a cover 305 of a cylinder touches an end surface of the cylinder 301 so that a spaciously closed structure is formed including the armature, the cover, the cylinder, the bottom of the cylinder—the magnetically hard insert with providing of a holding force without supplying voltage into the magnetizing coil. The armature 306 is connected with by a two-arm lever arm 318 with a gear of a drive of a starter and provides its engagement with a flywheel of the engine, while contacts 220 close a circuit of the electric motor of the starter. After the engine of the automobile is turned on, a control block supplies a demagnetizing pulse, which allows the armature under the action of a return spring 319 to return to an initial position together with the pinion of the starter drive. On the other end of the armature 306, a pusher 319 of the spring bias contacts 320 of turning on of the starter electric motor is provided.

Figure 12:
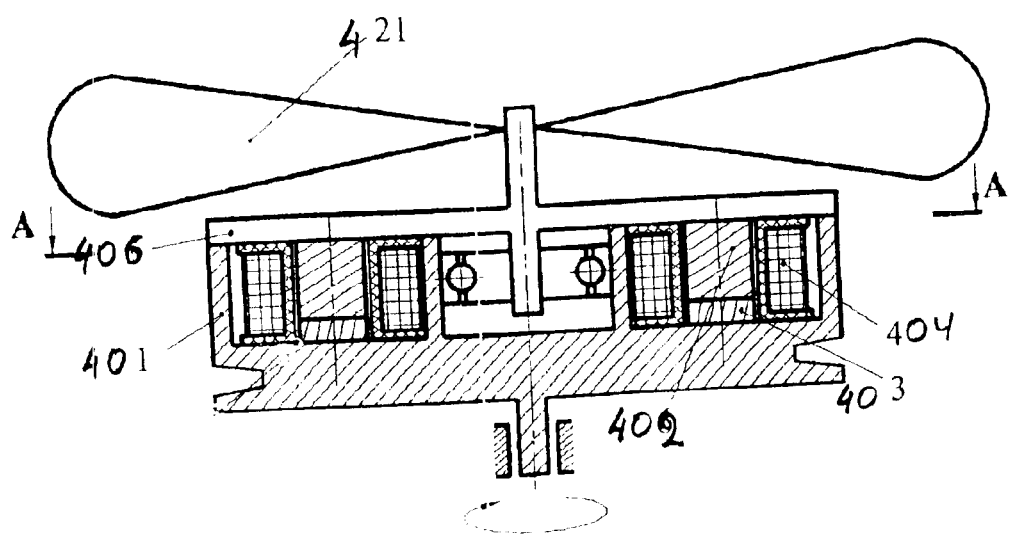
FIGS. 12 and 13 are views showing an electromagnetically operated device in accordance with the present invention which is formed as an electromagnetic coupling.
Figure 13:
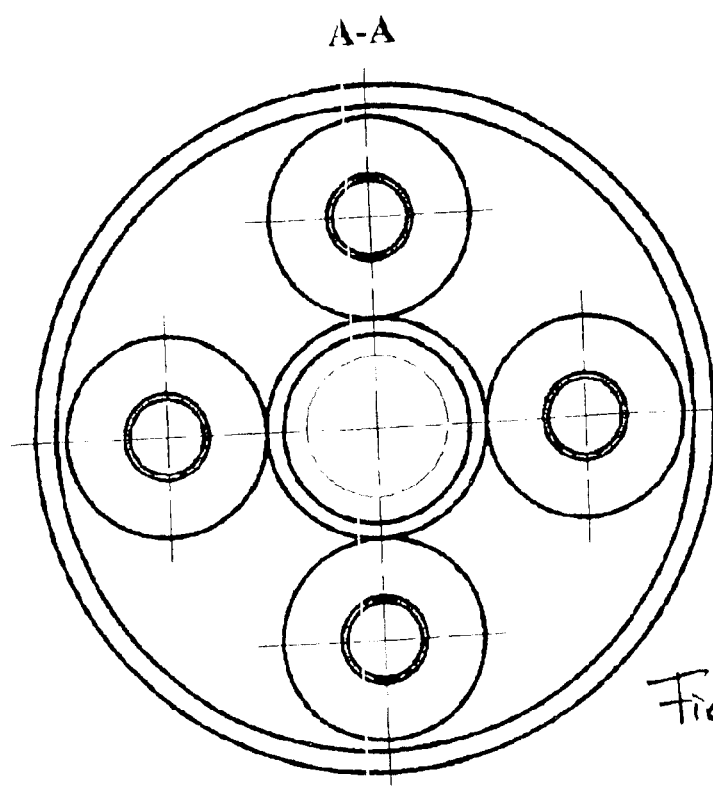

FIGS. 12, 13, show an electromagnetically operated device in accordance with the present invention which is formed as an electromagnetic coupling. It includes a cylindrical stator 401 which is provided with at least one steel rod 402 and an insert 403 of a magnetically hard material. The rod 402 is connected to the insert 403 and forms a discontinuation so that the outer end surface of the rod 402 is located in one plane with the end surface of the stator 401. The rod 402 is surrounded a magnetizing coil 404. A movable armature 406 is formed as the disc with a possibility of closing with its plane a magnetic circuit of the magnetic guide during a rotary displacement of the armature 406 relative to the stator 401. Short-term pulses of current are supplied to the winding of the magnetizing coil of the coupling and change a friction force between the contacting surfaces of the armature within a wide range so as to provide an optimal warming and cooling of the engine due to slipping of a fan of the cooling system.

Figure 14:
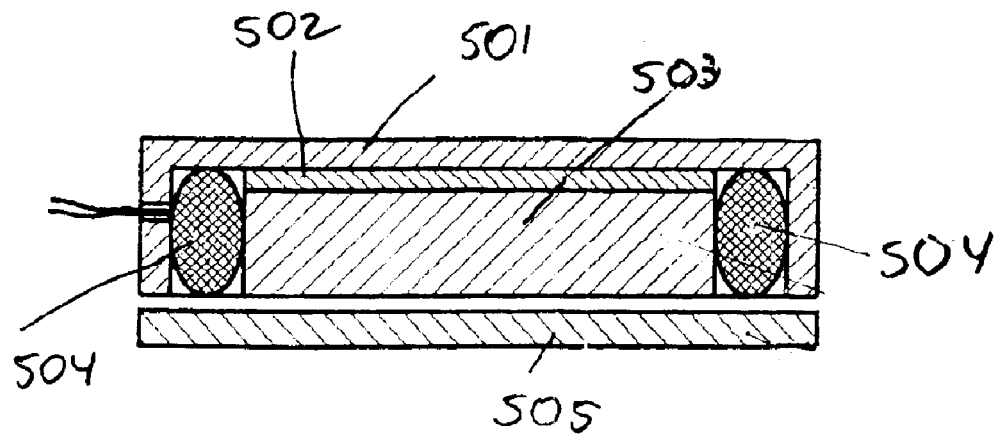
FIGS. 14 and 15 are views showing an electromagnetically operated device in accordance with the present invention which is formed as an electromagnetic lock and FIG. 16 is a view showing an electromagnetically operating device formed as a lifting device.
Figure 15:
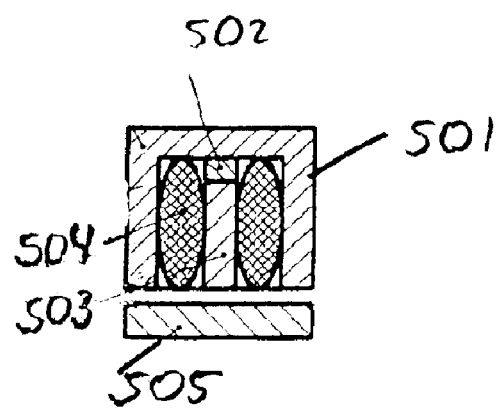

FIGS. 14 and 15 show the electromagnetically operated device formed as an electromagnetic lock. It includes a housing 501, a magnetically hard insert 502, a magnetically soft central rod formed as a bar 503, a magnetizing coil 504 and an armature 505. When a short term pulse is supplied into the magnetizing coil, a magnetic flux is generated between the armature and the stator, which provides a holding force which significantly increasing the conventional holding forces. The winding of the magnetizing coil remains without a power supply. In order to unlock the device, a pulse of an opposite polarity is supplied which removes the magnetic flux.

Figure 16:
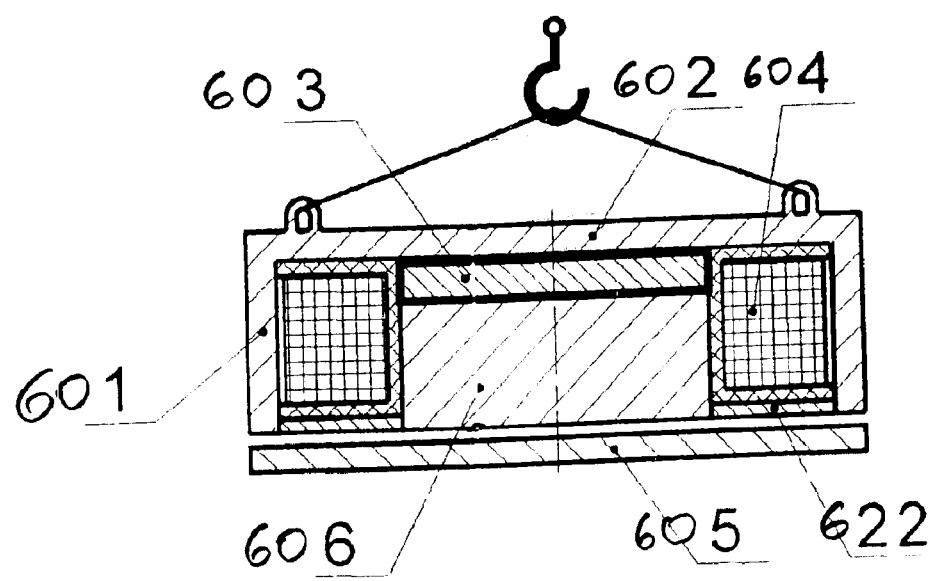

FIG. 16 is a view showing an electromagnetically operated device formed as a lifting device. The lifting device has a housing which is identified with reference numeral 601 and forms an immovable part of the device. It has an upper part 602. An insert of a magnetically hard material 603 is located in the housing 601. A magnetizing coil is identified with reference numeral 604. A rod of a movable part is identified with reference numeral 606. A cover 605 which closes the magnetic flux is formed here by a load to be lifted. Reference numeral 622 identifies a non magnetic protective layer. The operation of the device shown in FIG. 16 is similar to the operation of the device shown in FIGS. 14 and 15.

It will be understood that each of the elements described above, or two or more together, may also find a useful application in other types of methods and constructions differing from the types described above.

While the invention has been illustrated and described as embodied in method of controlling magnetic flux of electromagnetic, and electromagnet implementing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An electromagnetically operated device, comprising an electromagnet, said electromagnet including a magnetic guide having a movable armature and at least one air gap, a magnetizing coil provided on said magnetic guide, said magnetic guide having at least a part formed as an insert of a magnetically hard material, said magnetic guide having an immovable part formed as a cylinder, said movable armature being provided with a cover of said cylinder, said magnetizing coil being located inside said cylinder coaxially to the latter, a rod extending along an axis of said cylinder, located in an inner hollow of said cylinder, and having at least a part of composed of a electromagnetically soft material, said armature being formed so as to close said magnetic guide with formation of a three dimensional closed structure including said cylinder, said cover, said rod with a possibility of providing a holding force which is equal to a pulling force formed by a winding of said magnetizing coil during a supply of a short-term current pulse to the winding of said magnetizing coil and demagnetization of a material of said rod.

2. An electromagnetically operated device as defined in claim 1, wherein the electromagnetically operated device is formed as a valve, comprising a housing forming said cylinder, a seat substantially coaxial with the housing, said magnetizing coil being located coaxial in said housing, said movable armature located in a coaxial passage of said coil, and passages for passing a fluid between at least two cavities of the valve.

3. An electromagnetically operated device as defined in claim 1, wherein the electromagnetically operated device is formed as a compressor, comprising a housing forming said cylinder and composed of two parts each having said armature with an inlet valve and a spring located in an axial passage of said magnetizing coil, with said armatures connected with one another by a piston.

4. An electromagnetically operated device as defined in claim 1, wherein the electromagnetically operated device is formed as a starter relay for an automobile, with said armature connectable to a lever for turning on of a drive gear of a starter, and a pusher located in an opposite end of said armature.

5. An electromagnetically operated device as defined in claim 1, wherein the electromagnetically operated device is an electromagnetic coupling including a stator forming said cylinder and provided with a rod and connected to said insert so that an end surface of the rod is in a plane with an end surface of the stator, said magnetizing coil surrounding the rod, and the movable armature being formed as a disc and capable of closing with its plane a magnetic circuit of said magnetic guide during rotation of the armature relative to the stator.

6. An electromagnetically operated device as defined in claim 1, wherein the electromagnetically operated device is formed as an electromagnetic lock, comprising a housing forming said cylinder, magnetically hard insert, said magnetically soft rod formed as a bar, said magnetizing coil, and said armature.

7. An electromagnetically operated device as defined in claim 1, wherein the electromagnetically operated device is formed as a lifting device, said cover being formed by a load to be lifted.

8. An electromagnetically-operated device, comprising an electromagnet; means for controlling a magnetic flux of the electromagnet with a relay pulling characteristics characterized by at least two stabile levels of values of a magnetic flux in a magnetic guide, with a supply of controlling pulses of electric current into a winding of a magnetizing coil with obtaining a pulling force of a moving part of a magnetic guide of the electromagnet at least with one air gap, the magnetic guide being formed at least partially of a electromagnetically soft material which a property to maintain at least two stabile conditions of magnetization; means for supplying the controlling pulses as two short-term pulses having an opposite polarity and supplied into the magnetizing coil on the magnetic guide of the electromagnet, with a supply of a first pulse providing a closing of a magnetic circuit and minimization of magnetic resistance of the magnetic guide due to minimization of the air gap of the magnetic guide with subsequent maximization of the magnetic flux and the magnetic guide with its transfer to one of the stabile conditions characterized by a maximum value of an magnetic flux in the magnetic guide which corresponds to an energy of the controlling pulse action, with a possibility of maintaining the magnetic guide of the electromagnet in this stabile condition, and providing its holding or attracting force until a supply of a second controlling pulse of electric current of the opposite polarity whose energy characteristic has a value sufficient for transferring the magnetic guide into a second stabile condition which is characterized by a different value of the magnetic flux and a different value of the holding or attracting force.

9. A method of operating an electromagnetically operated device, comprising the steps of providing an electromagnetic drive including an electromagnet with a magnetic guide having a movable armature and at least one air gap, a magnetic coil, with the magnetic guide having at least a part formed as an insert of a magnetically hard material, an immovable part formed as a cylinder, with the movable armature formed as a cover of the cylinder; providing a rod extending along an axis of the cylinder, located in an inner hollow of the cylinder and having at least a part composed of a magnetically soft material; and closing by the armature the magnetic guide with formation of a three dimensional closed structure including the cylinder, the cover, the rod with a possibility of providing a holding force which is equal to a pulling force formed by a winding of the magnetizing coil during a supply of a short-term current pulse to the winding of the magnetizing coil and demagnetization of the material of the rod.

10. A method as defined in claim 9; and further comprising forming the electromagnetically operated device as a valve with a housing forming said cylinder, and a seat substantially coaxial with the housing, locating said magnetizing coil coaxial in said housing, locating said movable armature in a coaxial passage of said coil, and passing a fluid between at least two cavities of the valve through passages.

11. A method as defined in claim 9; and further comprising forming the electromagnetically operated device as a compressor with a housing composed of two parts forming the cylinder and each having said armature with an inlet valve and a spring located in an axial passage of a magnetizing coil, and connecting two armatures with one another by a piston.

12. A method as defined in claim 9; and further comprising forming the electromagnetically operated device as a starter relay for an automobile, connecting said armature to a lever for turning on of a driver gear of a starter, and providing a pusher located in an opposite end of said armature.

13. A method as defined in claim 9; and further comprising forming the electromagnetically operated device as an electromagnetic coupling including a stator forming said cylinder and provided with a rod and connected to said insert so that an end surface of the rod is in a plane with an end surface of the stator, surrounding the rod by said magnetizing coil, and forming the movable armature formed as a disc and capable of closing with its plane said magnetic circuit of a magnetic guide during rotation of the armature relative to the stator.

14. A method as defined in claim 9; and further comprising forming the electromagnetically operated device as an electromagnetic lock with a housing forming said cylinder, said magnetically hard insert, said magnetically soft rod formed as a bar, and said magnetizing coil, and said armature.

15. A method as defined in claim 9; and further comprising forming the electromagnetically operated device as a lifting device, and using a load to be lifted as said cover.

* * * * *